Sheet 1-2 Sheets.
T. N. Lupton.
Mower.
No. 2382
Reissued Oct. 23, 1866.
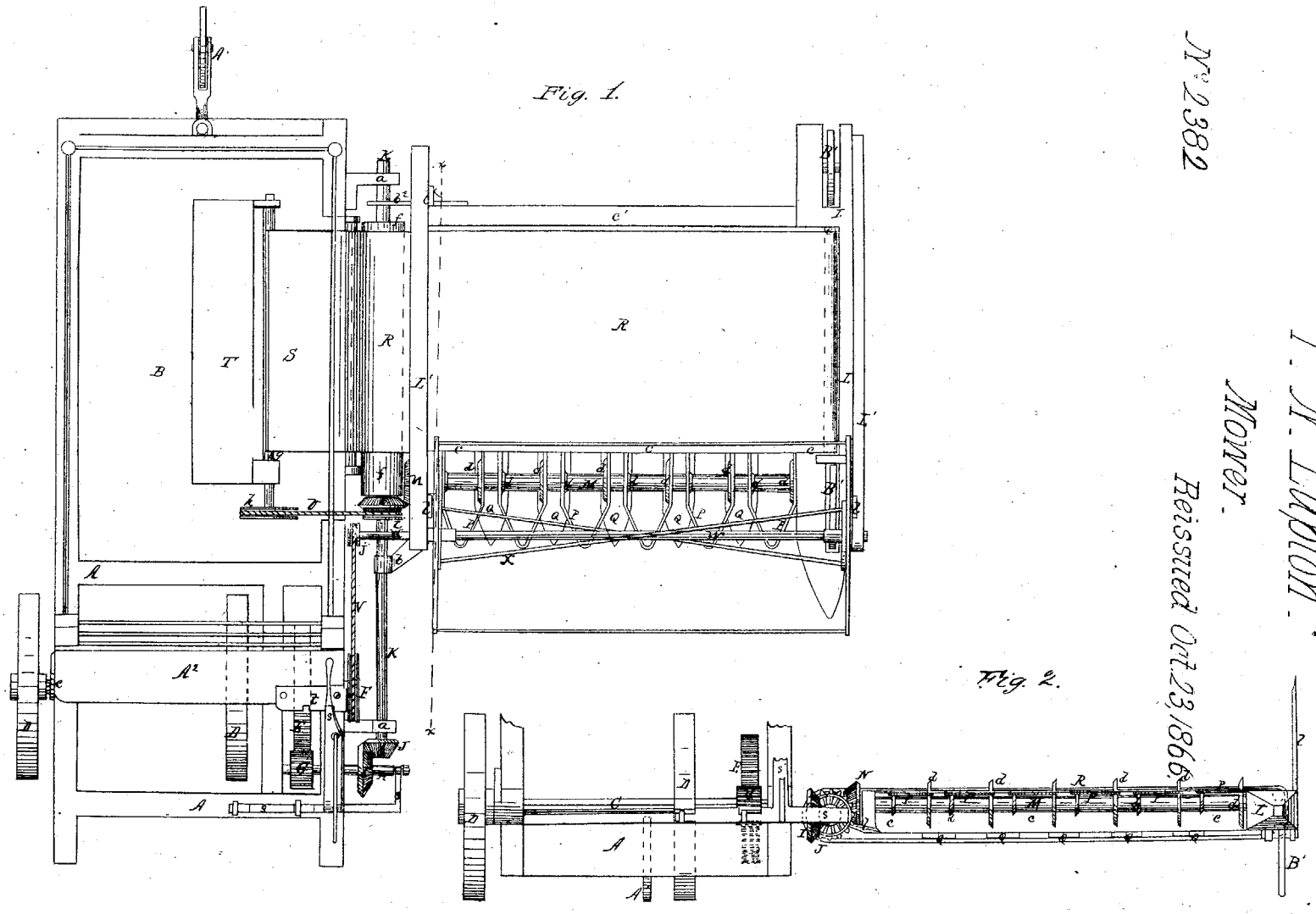
Witnesses.
Ch. Dieterhofer
Henry Ulbrich
Inventor
R. T. Campbell
Assignee of T. N. Lupton Sheet 2-2 Sheets
T. N. Lupton.
Mower.
No. 2382 Reissued Oct. 23, 1866.
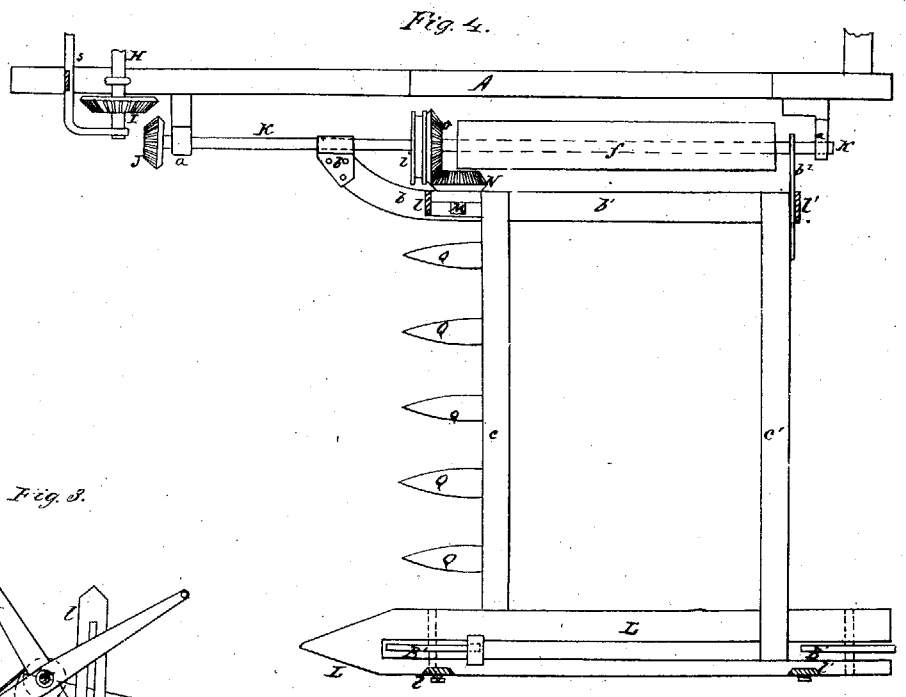
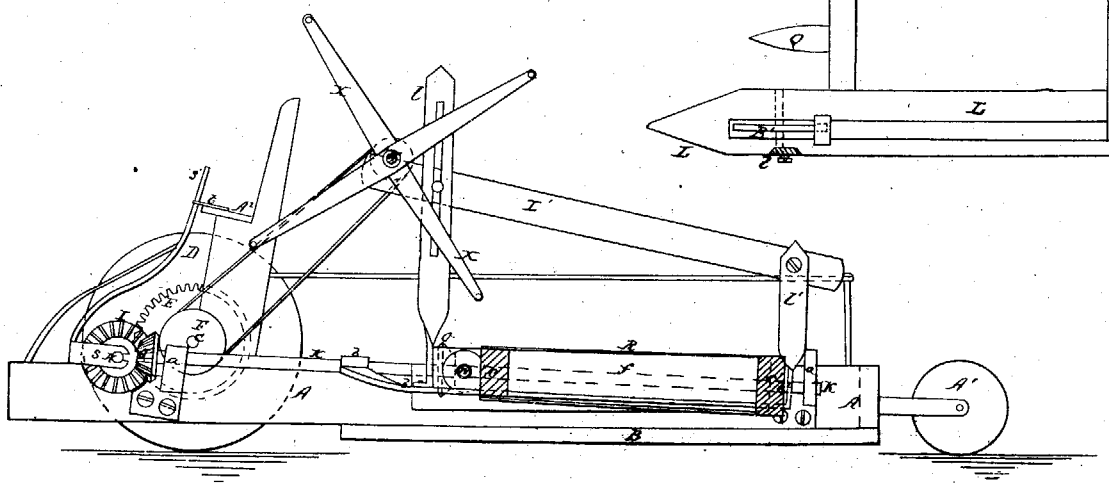
Witnesses
Robert Schaefer
Henry Clayton
Inventor
R. S. Campbell
Assignee of T. N. Lupton

UNITED STATES PATENT OFFICE.

ROBERT T. CAMPBELL, OF WASHINGTON, DISTRICT OF COLUMBIA, ASSIGNEE OF T. N. LUPTON.

IMPROVEMENT IN HARVESTERS.

Specification forming part of Letters Patent No. 12,824, dated May 8, 1855; Reissue No. 2,382, dated October 23, 1866.

*To all whom it may concern:*

Be it known that T. N. LUPTON, of Winchester, in the county of Frederick and State of Virginia, did invent an Improved Reaping and Mowing Machine; and your petitioner hereby declares that the following is a full and exact description thereof, reference being had to the accompanying drawings, making a part of this specification, in which—

Figure 1 is a top view of the machine arranged for reaping. Fig. 2 is a front elevation of the same without the driver's seat and reel. Fig. 3, Sheet 2, is a longitudinal section, taken in the vertical plane, indicated by red line *x x* in Fig. 1. Fig. 4 is a top view, showing the mode of hinging the finger-beam to the main frame.

Similar letters of reference indicate corresponding parts in the several figures.

This invention relates to certain novel improvements on machinery which is designed for cutting grass and grain, in which the finger-beam projects laterally from one side of the main frame, and receives its vertical movements independently of the main frame from the undulations of the ground.

The main object of the invention is to provide for strengthening a finger-beam which projects from one side of a main frame or carriage against backward strain or thrust by means of a diagonal brace, which is hinged concentric with the axis about which the finger-beam articulates, and an auxiliary hinging-support, as will be hereinafter described.

Another object of the invention is to have a vibrating finger-beam sustained against the pressure to which it is subjected during the cutting of grass or grain by means of a brace, the axis of motion of which shall coincide with the axis of motion of the finger-beam, as will be hereinafter described.

Another object of this invention is to employ, in combination with a hinged or vibrating finger-beam which projects laterally from one side of a carriage and receives its motions at its outer ends from the undulations of the ground, such means as will reel or gather in the standing grain to be cut; also to employ, in combination with a reel or gatherer, such means as will carry off the cut grain from behind the cutters, both of which devices, whether they are used separately or together, move in harmony with the said finger-beam, independently of the draft-frame, as will be hereinafter described.

Another object of this invention is to provide for enabling the attendant, while sitting upon the draft-frame, to stop and start the movements of the cutting apparatus; and also the means employed for carrying off the cut grain at pleasure when the finger-beam is hinged to and projects out laterally from one side of the draft-frame, as will be hereinafter described.

To enable others skilled in the art to understand the invention, I will describe its construction and operation.

In the accompanying drawings, A represents the draft-frame, which is supported upon two large wheels, D D, near its front end, and a single caster-wheel, $A^1$, at its rear end. The wheels D D are applied to a transverse axle, C, which has a large spur-wheel, E, keyed on it, near the grain or outer side of the machine. This spur-wheel E engages with the teeth of a wide pinion-wheel, G, which is applied to a transverse shaft, H, that is parallel to the axle C, and that projects out from the outer side of the frame A and carries a bevel spur-wheel, I. This shaft H is allowed to have an endwise movement, for the purpose of enabling the attendant to engage the wheel I with a bevel-wheel, J, on shaft K, or to disengage these wheels at pleasure. The extreme outer end of the transverse shaft H is embraced by the bent end of a laterally-sliding bar, S, which is held down in place upon the front beam of frame A in a suitable manner, and moved by means of a handle, $S^1$, the upper end of which is caused to engage with a notched plate, *t*, affixed to the driver's seat $A^2$, as shown in Fig. 1.

The driver's seat $A^2$ is mounted upon standards which project up from the side bars of the frame A.

The shaft K is supported by means of bearings *a a*, which are secured rigidly to the outer side of the outer longitudinal beam of frame A. This shaft K inclines from its front end backward, and is a medium through which motion is communicated to the cutting apparatus and also to an endless apron, R. To this shaft K the finger beam or bar *c* is hinged by means of a diagonal brace, *b*, which is represented in the drawings as being made of metal of sufficient strength to resist the strain upon the front edge of said finger-bar during the operation of cutting. This brace is provided with an eye-bearing on one end, which receives the shaft K and allows the finger-beam *c* to receive its vertical movements from the undulations of the ground over which it is drawn.

The finger-beam *c*, the outer divider-beam L, and a rear transverse beam, C′, together with the longitudinal straight portion $b^1$ of the diagonal brace *b*, constitute a frame for the endless apron R, upon which the cut grain falls. This frame is sustained at its rear inner end by means of a transverse brace, which is lettered $b^2$ in Figs. 1 and 4, and which is pivoted to the shaft K near the rear bearing, *a*, thereof.

The said shaft K not only serves as a means for communicating motion to the cutting apparatus and the contrivance for carrying off the cut grain, but it also forms a strong side bar or shaft of the main frame A, by means of which the finger-beam *c* and platform-frame can be hinged to the main frame, so as to rise and fall independently of this main frame, and thereby conform to the undulations of the ground.

When the machine is in operation, cutting either grass or grain, the pressure which is brought against the front edge of the finger-beam would cause this beam to be deflected out of its straight line, and would also cause the joint of this finger-beam to bind hard. This is obviated by the diagonal brace *b*, which, being arranged obliquely to the direction of the force which is brought to bear against the finger-beam, will sustain this beam firmly in the desired position.

The diagonal brace *b* also serves as a guard for gathering in the grain which may lean toward the main frame, thus enabling the cutting apparatus to take in a full swath as the machine is drawn along.

The endless apron R, which conducts off the cut grain in a lateral direction, is stretched over two drums, *e f*, the latter one of which is applied to the shaft K, as shown in Fig. 1, so that the vertical movements of the frame and finger-beam shall not affect the working of this apron. By thus applying the apron the movements of the finger-beam and its frame will not be interfered with, as the driving-drum *f* is concentric with the axis of such parts. Such arrangement also admits of the motion of the apron being stopped or started at pleasure by disengaging the wheel I from wheel J, or engaging these wheels.

On the outer end of the axle C of the transporting-wheels D D is a pulley, F, which communicates motion to a smaller pulley, *j*, by means of an endless band, V. The pulley *j* is fast on the inner end of a reel-shaft, W, which has its end bearings upon the forward ends of two longitudinal beams, L′ L′, which have their supports upon standards *l l′*, projecting up from the finger-beam and its frame, as shown in Figs. 1 and 3. The beams L′ are secured to the front standards *l* by means of transverse fastenings, which pass through vertical slots made through said standards. This will admit of the reel X being adjusted higher or lower, according to the height or condition of the grain. The reel itself may be constructed in any suitable manner, and requires no particular description.

By having this reel mounted upon the platform-frame, it will be seen that the reel will rise and fall and move in harmony with this frame.

It will be seen, by reference to Figs. 1, 2, and 4, that the outer end of the platform-frame is sustained upon the ground by means of two small wheels, B′ B′, which prevent this frame from being dragged over the ground and assist it over obstructions in its path.

Directly in front of the finger-beam or bar *c* there is a shaft, M, the ends of which work in suitable bearings. At the outer end of this shaft M there is secured a bevel-pinion, N, which gears into a corresponding pinion, O, on the shaft K. The shaft M is provided with cutters *d*, any proper number being used. The form of these cutters is elliptical, terminating in acute points. Each cutter is formed of two blades, which project an equal length from opposite sides of the shaft. To the finger-bar *c* there are secured two sets of fingers, P Q, the fingers P projecting over the shaft M and the fingers Q underneath of it, both sets of fingers projecting outward about the same distance beyond the shaft M, as shown in Fig. 1.

The upper fingers, P, are formed of stout wire or iron rods, bent as shown in Fig. 1, so that each finger will inclose two cutters, the front ends of the fingers being bent so as to form a point. The cutters within the fingers are near the inner surfaces of the wire or rods forming the sides of the fingers, a cutter being at each side.

The lower fingers, Q, are formed of metal plates pointed at their ends. The fingers Q are so attached to the finger-bar *c* as to be on a line between the upper fingers, P, (see Fig. 2,) and the wires or rods forming the sides of the upper fingers, P, project a short distance over the sides or edges of the lower fingers, Q. The cutters *d* are placed in a reverse position on the shaft M—that is to say, every alternate cutter is placed at right angles with the intermediate ones.

S is an endless apron, the lower end of which works over a roller attached to the frame A, and the upper end of which works over a roller, *g*, on a small table or platform, T, which is attached to the bottom B of the main frame A. V is a belt which transmits motion to the inclined apron S from a pulley, *i*, on the shaft K.

The team is attached to the front end of the draft-frame, and as the machine is drawn along the cutter-shaft M is caused to rotate by means of the bevel-pinions N O, the shaft K being rotated by the bevel-pinions I and J. The endless aprons R and S are operated by the belt V, which passes over the pulleys *h i* and the drum *f;* and the reel X is operated by the belt V, which passes over the pulleys F and *j*.

The grass, or the standing grain, as the case may be, passes between the upper fingers, P, and the lower fingers, Q, and as the lower fingers are placed in a line between the upper fingers, and the edges of the two sets of fingers slightly overlap each other, the grass or grain is inclined or bent over at an angle and brought within the sweep of the cutters and cut. The cut grain is carried to the box B by the endless aprons R and S, and may be bound in sheaves on the bottom of frame A by an attendant, and then thrown on the ground.

When the machine is used for cutting grass, those parts which are not required may be removed.

It will be observed that the cut grain is deposited upon the bottom board, B, by the endless aprons, for the purpose of enabling an attendant riding upon the machine to bind the grain; but it is obvious that the grain may be deposited upon the ground in rear of the driving-wheels D D by leaving off the bottom board, B.

It will be observed, from the above description, that a hinged connection is made between the draft-frame and finger-beam in such manner that the outer end of the finger-beam is free to fall into valleys and to rise over hills, no matter how great may be the deviation from a horizontal line.

It will also be seen that the reel is supported by this hinged connection and by the ground, instead of being suspended wholly upon the hinge a great distance above the ground.

It will also be seen that the arrangement is such that the same machine is adapted, by a very slight adjustment, for both reaping and mowing; and, finally, it will be seen that the hinging-brace and the hinge-support of the finger-beam are both concentric with one another and are hinged to the support in such manner as to move in harmony together.

The rejected application of E. P. Cavett shows a finger-beam which is hinged at its inner end to a pendant which is secured rigidly to the main frame. This finger-beam is sustained to some extent against backward strain by a diagonal bar, which is attached at its forward end to the finger-beam, near the outer end thereof, and at its rear end this bar is linked to the main frame at a point which is above the plane of the hinged joint of the finger-beam. Such a brace will not sustain the joint of the finger-beam, nor is its point of connection to the main frame in a line coinciding with such joint. The axes of motion of the brace and finger-beam are not concentric.

The rejected application of Tarbox and Keeney shows a hinged finger-beam which is sustained by a diagonal back brace, the axis of motion of which is concentric, or nearly so, with the axis of the finger-beam, which it sustains. But this diagonal brace is arranged behind the finger-beam, and does not form a front guard for elevating and gathering up leaning grain. This back brace performs no other office than that of imperfectly sustaining the finger-bar against backward strain.

Brown and Bartlett patented January 2, 1855, a machine in which they show a finger-bar secured rigidly to a rod which is pivoted at its forward and rear ends to a drag-bar, so as to allow the finger-bar to vibrate about said pivots. In this case the length of bearing or hinge of the finger-bar is increased over some other joints used, and no separate brace for sustaining the joint is used. There is neither a forward nor a back brace employed to sustain this hinge against the back thrust upon the finger-bar.

I am also aware that a diagonal brace has been used for sustaining the folding inner section, to which a finger-bar was hinged; but in this case the finger-bar itself was not braced beyond its jointed connection to the said folding section.

In my machine a diagonal brace, *b*, is secured to the inner end of the finger-bar *c*, extends forward and inward, and is hinged by an eye formed on it to the shaft K, thus serving the double purpose of a guard and of a diagonal brace.

In January 2, 1855, Burnett and Vandertvoerd patented a machine in which the driving-shaft to which the finger-bar was hinged also gave motion to the cutters. But said shaft was not arranged so as to receive its motion directly from a transverse shaft upon the draft-frame. In this case a vertical shaft was necessary to communicate motion from the transverse shaft to the depressed longitudinal shaft.

I am also aware that harvesting-machines have been made with the reels for gathering in the standing grain to be cut, which were supported at one end upon the draft-frame and at the other end upon a post projecting up from a hinged platform. But it is obvious that the reel-shaft could not, when thus arranged, move in harmony with the platform, and preserve a parallelism therewith. The vibrations of the platform in such cases would cause the reel-shaft to bind and twist in its bearings, and greatly augment the power required to turn these reels.

In the case of A. Randall, in 1833, the reel-shaft was connected by a gimbal-joint to a driving-shaft on the main frame; but none of these plans effected the object which I have claimed—of having the reel wholly mounted and supported upon a hinged platform, the outer end of which undulates with the ground over which it is drawn.

In the case of Gieger, rejected in the year 1849, for a machine for topping and thrashing grain, the platform is not arranged to vibrate about its joint while the machine is cutting. This platform is sustained at its inner end only.

I wish to be understood that in this whole specification the term "vibrating platform" is used in contradistinction to a platform or finger-beam which is secured to the frame of a single-wheel machine and only vibrates with such wheel.

What I claim as new, and desire to secure by Letters Patent, is—

1. The application of a hinged diagonal brace, *b*, in front of the finger-beam, for the purpose of sustaining such beam against backward strain and thrust, substantially as set forth.

2. Hinging a diagonal brace, *b*, which extends forward of the finger-beam, so that its axis of motion shall coincide with the axis of motion of said beam, substantially as described.

3. Sustaining the platform-frame and the finger-beam by means of a forward diagonal brace, *b*, and a rear brace, $b^2$, substantially as described.

4. A hinged diagonal brace, which extends forward of the finger-beam and is adapted to serve as a guard and also as a means of sustaining the finger-beam against backward strain, substantially as described.

5. A diagonal brace which is connected at one end to the finger-bar, and extended forward of the same and connected, by an eye formed on it, to the draft-frame, so as to move concentric with the axis of motion of said finger-beam, substantially as described.

6. Extending the brace *b*, as claimed in the fifth clause of the claim, under the platform which sustains the fallen grain, substantially as described.

7. An inclined shaft, K, supported in bearings *a a* upon the inner side of the draft-frame, and adapted to serve as a driving-shaft for the cutters and also as a means for hinging the finger-beam to said draft-frame, and arranged, with respect to a horizontal shaft, H, or equivalent, substantially as described.

8. In combination with a vibrating finger-beam which projects laterally from the grain side of a draft-frame, and which receives vertical movements independently of the frame from the undulations of the ground over which it is drawn, a reel, or its equivalent, mounted wholly upon the finger-beam or its platform, for gathering in the standing grain, substantially as described.

9. In combination with the subject-matter of the eighth clause of the claim, means which will carry off the cut grain from behind the cutting apparatus and deliver it from the inner side of the platform, substantially as described.

10. In combination with a finger-beam which vibrates independently of the main draft-frame and is supported at its outer end upon the ground, providing means which will enable the attendant, while riding upon the machine, to stop and start the cutting apparatus, and the means employed for conveying the grain away from behind the cutting apparatus, substantially as described.

11. The employment of the cutters *d*, placed on the rotating shaft M, in combination with the two sets of fingers P Q, the said parts being constructed and operating substantially as described.

12. Supporting a reel, or its equivalent, at its inner end by the hinge of the finger-beam and at its outer end by a wheel, or other equivalent device, substantially as described.

13. Supporting both a device which moves the cut grain to one side of and away from behind the cutters and a device which reels in the uncut grain to the cutting apparatus by means of the axis of a hinge at the inner end of the finger-beam, and a wheel, or its equivalent, at the outer end of such beam, substantially as described.

14. Supporting a reel wholly upon the hinged finger-beam or platform which receives the falling grain, in combination with applying the finger-beam, thus wholly carrying the reel, to one side of the draft-frame, in such manner that the finger-beam and reel together will be supported at one end by a hinge-connection and by a wheel, or its equivalent, at the other end, substantially as described.

R. T. CAMPBELL.

Witnesses:
EDM. F. BROWN,
HENRY SYLVESTER.